C. H. OVERKAMP & F. STREICH.
LOAF FORMING MACHINE.
APPLICATION FILED FEB. 14, 1908.
901,031.
Patented Oct. 13, 1908.
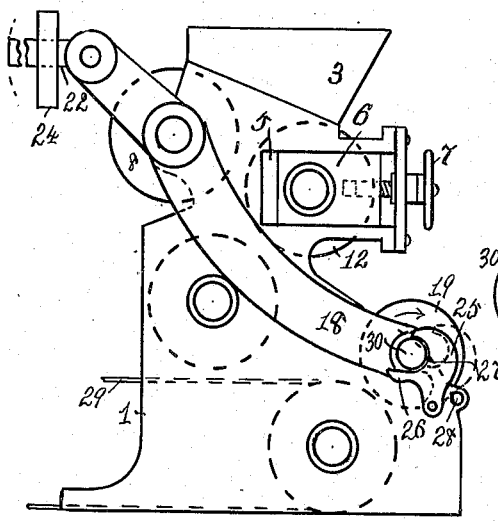
Fig. 1.
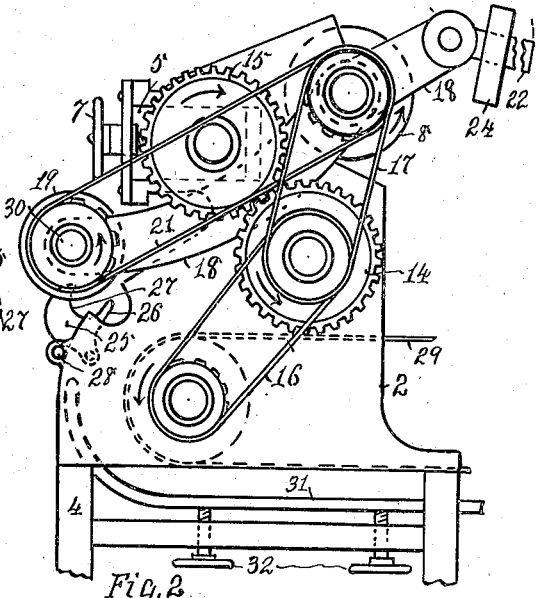
Fig. 2.
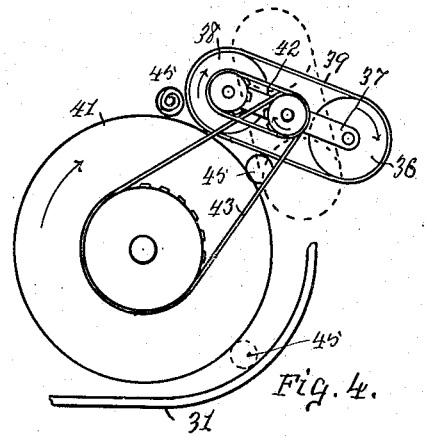
Fig. 4.
Fig. 3.
WITNESSES.
S. C. Rogers
Samuel S. Carr
Charles H. Overkamp,
and Frank Streich,
INVENTORS.
By Robert S. Carr. Atty.

UNITED STATES PATENT OFFICE.

CHARLES H. OVERKAMP AND FRANK STREICH, OF CINCINNATI, OHIO, ASSIGNORS TO THE TRIUMPH MANUFACTURING COMPANY, OF CINCINNATI, OHIO, A CORPORATION OF OHIO.

LOAF-FORMING MACHINE.

No. 901,031.  Specification of Letters Patent.  Patented Oct. 13, 1908.

Application filed February 14, 1908. Serial No. 415,834.

*To all whom it may concern:*

Be it known that we, CHARLES H. OVERKAMP and FRANK STREICH, citizens of the United States, residing at Cincinnati, Ohio, have invented a new and useful Improvement in Loaf-Forming Machines, of which the following is a specification.

Our invention relates to loaf forming machines whereby a predetermined quantity of plastic material as dough, may be rolled into a sheet of desired thickness, then coiled into a cylindrical shape and afterward formed as desired, and the objects of our improvements are to provide adjustable means for partially counterbalancing the forming roller; automatic means for preventing the forming roller from rebounding by contact with the apron roller; to effect the coiling of the sheet of dough with only two rollers; to provide means for automatically discharging the dough upon the completion of its coiling; to provide adjustments for adapting the machine for use with plastic material of different consistencies, and to provide simple and durable construction and assemblage of parts combined with facility of operation and efficiency of action. These objects are attained in the following described manner, as illustrated in the accompanying drawings, in which:

Figures 1 and 2 are opposite side elevations respectively of a loaf forming machine embodying our improvements; Fig. 3, a longitudinal vertical section, and Fig. 4, a diagram of a modified form of construction.

In the drawings, 1 and 2 represent the respective side walls of the frame surmounted by a hopper 3 and supported on a base or table 4. Each of said walls is formed with a gap 5 wherein a bearing 6 is adjustable by means of a hand screw 7. Feed roller 8, pressure roller 9 and apron roller 11 are extended between, and journaled at their ends in the respective side walls 1 and 2, and feed roller 12 journaled in bearings 6 coöperates with rollers 8 and 9 for reducing a lump of dough to a sheet 13 of predetermined thickness as shown in Fig. 3.

Pressure roller 9 (driven from a source not shown) is provided with a gear 14 which meshes with a similar gear 15 on the adjustable feed roller 12 and the apron roller 11 and the feed roller 8 are driven from said pressure roller 9 by means of sprocket chain connections 16 and 17 therewith. A yoke 18 trunnioned on the outside of the walls 1 and 2 and preferably concentric with the axis of feed roller 8 carries on one end a forming roller 19 which coöperates with the apron roller 11 and is driven from the said feed roller 8 by means of sprocket chain connections 21 therewith. A projecting beam 22 is adjustably secured on the opposite end of the yoke by means of a set screw 23 and a weight 24 is adjustable on said beam for partially counterbalancing the weight of the yoke and the forming roll 19 on the trunnions.

A latch 25 formed with a projecting lip 26 and with a notch 27 thereover adapted to detachably engage with the journal 30 of the forming roller 19 is pivotally secured to the outside of one of the walls 1 in such manner that it will fall and remain in the open position by its own gravity and in contact with a fixed stop 28, as shown in Fig. 2. An endless apron 29 is carried by the apron roller 11 and by an idle roller (not shown), and a forming board 31 of any desired surface configuration is adjustably mounted under said apron and the roller 11 by means of hand screws 32. The feed rollers 8 and 12 and the pressure roller 9 are respectively provided with the usual scrapers 33, 34 and 35, and together with the forming roller 19 are driven at the same peripheral speed, while the apron roller 11 is preferably driven at a little higher speed than that of said forming roller.

A modified form of construction is shown in Fig. 4 wherein an idle roller 36 is substituted for the weight 24 to partially counterbalance the yoke 37 and the forming roller 38 thereon, and the endless apron 39 is carried by said idle and forming rollers instead of by the apron roller 41.

The sprocket chain connections 42 and 43 serve to drive the forming roller with the apron, from the roller 41 and at a slightly different speed in relation thereto.

In operation, the sheet of dough 13 is curved by contact with the apron and thence carried thereby in contact with the forming roller whose peripheral speed being slower than the apron, coöperates therewith in coiling said sheet into a cylindrical roll 45. The weight 24 may be so adjusted on the beam 22 that the completed roll 45 under the action of the apron will raise the forming roller and be discharged thereunder upon the forming board and thence rolled by the apron and discharged from its opposite end. After the roll is discharged under the forming roller said roller will fall by gravity with the journal 30 in contact again with the side walls and unless prevented will rebound and permit the succeeding sheet of dough to pass thereunder. It therefore becomes necessary for facilitating the action of the machine to provide means for preventing the rebounding of the forming roller. The gravity latch 25 serves this purpose admirably by being automatically thrown with its notch 27 over the journal 30 of said roller by contact of said journal with the lip 26 of the latch in the descent of the roller. After the rebounding of the roller is thus counteracted by the latch it falls of its own gravity and releases the journal as the said roller is raised above the lip 26 during the formation or discharge of the succeeding roll 45.

As shown in Fig. 4, the rebounding of the forming roller is counteracted by the contact of the roll 45 with the apron during its discharge thereunder instead of by means of the latch 25. The delicate adjustment of the weight 24 adapts the machine to the use of dough of a wide range of consistencies.

Having fully described our improvements, what we claim as our invention and desire to secure by Letters Patent of the United States is:—

1. A loaf forming machine comprising cooperating rollers, the one being movable by gravity toward the other, and automatic means arranged to temporarily check its return movement.

2. A loaf forming machine comprising cooperating rollers, the one being movable by gravity toward the other, means for driving the rollers at different speeds, and means for automatically locking and releasing said movable roller at a predetermined point in its return movement.

3. A loaf forming machine comprising cooperating rollers, the one being movable by gravity toward the other, means for automatically intercepting the return movement of the movable roller, and means for driving said rollers at different peripheral speeds respectively.

4. A loaf forming machine comprising an apron roller, an endless apron carried thereby, a yoke trunnioned at fixed points, a forming roller supported thereon and adapted to contact by gravity with the apron, a weight adjustable on the yoke for partially counterbalancing the weight of the forming roller, and automatic means for intercepting the movement of the yoke.

5. A loaf forming machine comprising cooperating driven rollers, the one being movable in relation to the other, and a gravity latch arranged to automatically and momentarily retain the said movable roller in a predetermined position.

6. A loaf forming machine comprising a gravity latch pivotally secured at a fixed point and provided with a lip and with a gap, a member movable in contact with the lip whereby the latch is lifted with the gap in detachable engagement with said member for the purpose specified.

CHAS. H. OVERKAMP.
FRANK STREICH.

Witnesses:
STANLEY E. BOWDLE,
R. S. CARR.